United States Patent [19]

Yoshimura et al.

[11] Patent Number: 4,873,587
[45] Date of Patent: Oct. 10, 1989

[54] VIDEO SIGNAL REPRODUCING APPARATUS WITH MEMORY

[75] Inventors: Katsuji Yoshimura, Kanagawa; Susumu Kozuki, Tokyo; Hiroo Edakubo; Chikara Sato, both of Kanagawa, all of Japan

[73] Assignee: Canon Kabushiki Kaisha, Tokyo, Japan

[21] Appl. No.: 89,307

[22] Filed: Aug. 25, 1987

[30] Foreign Application Priority Data

Aug. 28, 1986 [JP] Japan ............................. 61-200002

[51] Int. Cl.[4] .................. H04N 5/76; H04N 5/782; H04N 5/907
[52] U.S. Cl. .................................. 360/9.1; 360/10.1; 360/10.2; 360/10.3; 358/312
[58] Field of Search ............... 360/10.1, 10.2, 11.1, 360/25, 35.1, 9.1, 10.3, 18, 14.2; 358/312

[56] References Cited

U.S. PATENT DOCUMENTS 4,360,842 11/1982 Onishi et al. ........................ 360/25
4,698,698 10/1987 Collins ............................... 360/10.1

Primary Examiner—Marvin L. Nussbaum
Attorney, Agent, or Firm—Robin, Blecker & Daley

[57] ABSTRACT

A video signal reproducing apparatus for reproducing video signals from a record bearing medium on which many recording tracks are formed in parallel to each other with a given-period portion of the video signal recorded in each of the tracks are arranged: To compare, on the basis of signals reproduced by a reproducing head, the level of a reference signal with that of a reproduced state detection signal the level of which varies according to the reproduced state of the video signal; to determine, on the basis of the result of comparison, whether or not the video signal reproduced by the reproducing head is to be written into a memory device which is capable of storing the given-period portion of the video signal therein; and to change a level relation between the reproduced state detection signal and the reference signal from one level relation over to another according to the track pitch of the recording tracks which is detected using the signals reproduced by the reproducing head.

15 Claims, 4 Drawing Sheets

VIDEO SIGNAL REPRODUCING APPARATUS WITH MEMORY

BACKGROUND OF THE INVENTION

1. Field of the Invention

This invention generally relates to a video signal reproducing apparatus and more particularly to an apparatus arranged to reproduce video signals from a record bearing medium on which many tracks are formed in parallel to each other with a video signal for a given period of time recorded in each of the tracks and to perform reproduction using a memory device which is capable of storing the video signal for the given period.

2. Description of the Related Art

For adequately carrying out a so-called special reproduction such as slow-motion reproduction, a high speed search or look-up reproduction, etc. with a video tape recorder (hereinafter referred to as VTR for short), it has been proposed and practiced to arrange a head in addition to the normal recording and reproducing heads and to use it solely for the special reproduction.

However, this method increases the number of heads to make the arrangement of a rotary head drum complex and thus necessities a greater number of rotary transmitters for signal exchange with the heads mounted on the rotary drum. In the event of a rotary drum of small diameter, therefore, it becomes extremely difficult to mount and arrange the increased number of heads on the small drum. Besides, the rotary transmitters for these heads must be narrowly spaced thus running the hazard of the adverse effect of cross-talks among the rotary transmitters. In that instance, therefore, it is hardly possible to obtain an adequately reproduced video signal.

To solve this problem, a VTR which has recently been proposed is arranged to use a so-called field memory which has a storage capacity corresponding to one field portion of a video signal; to write into the memory only some acceptable parts of a reproduced video signal obtained from the normal reproducing head; and thus to always adequately carry out a special reproducing operation by reading out the good video signal parts from the field memory. This VTR is capable of adequately carrying out the special reproduction without increasing the number of heads.

This method of carrying out the above stated special reproduction by using a field memory, however, raises a question as to how to determine "the good parts of the reproduced video signal." This determination may be made in varied ways. For example, in one conceivable way, the reproduced signal may be determined to be good if the level of the reproduced RF signal thereof is higher than a given level. In another way, the reproduced signal may be determined to be good if not much tracking error is detected from the signal reproduced by the rotary head. The details of these methods are described in U.S. patent application Ser. Nos. 058,326, filed June 4, 1987 and 062,929, filed June 16, 1987, both of which having been assigned to the assignee of the present invention. Meanwhile, in the case of a VTR of the kind arranged to permit setting recording tracks at different track pitches, adoption of the above stated method presents the following problem:

The level of the reproduced RF signal and that of the tracking error signal to be used as criteria for determining the above stated "good reproduced video signal" are dependent on such parameters as the pitch and width of the recording tracks and the width of the head. With the "good reproduced video signal" thus determined by comparison with the given level, the generation frequency of the "good reproduced video signal" comes to vary with the pitch at which the recording tracks are formed.

If the criterion for determining the "good reproduced video signal" is set at a relatively high value, in case that a high speed search reproducing operation is performed, for example, for some of the recording tracks that have a low generation frequency of the "good reproduced video signal," the amount of the video signal written into the field memory comes to decrease. In this case, it is hardly possible to obtain output pictures in an adequate state either because the output time intervals of the reproduced pictures would become too long or because there might arise an unvarying part within the reproduced picture output.

Meanwhile, if the criterion for determining the "good reproduced video signal" is set at a low value, a high speed search reproducing operation, for example, on recording tracks having a low generation frequency of the "good reproduced video signal" would result in a deteriorated S/N ratio of the reproduced picture output, because: In that case, the reproduced video signal would be written into the field memory in a state of having an excessively poor S/N ratio.

SUMMARY OF THE INVENTION

This invention is directed to the solution of the above stated problems of the prior art. It is therefore a general object of the invention to provide a video signal reproducing apparatus which is capable of adequately processing reproduced signals using a memory device for each of varied track pitches.

It is a more specific object of this invention to provide a video signal reproducing apparatus which is capable of adequately performing a special reproduction by writing only an adequately reproduced video signal into a memory device for each of different track pitches.

Under this object, a video signal reproducing apparatus arranged according to this invention to reproduce video signals from a record bearing medium on which many recording tracks are formed in parallel to each other with a given period portion of the video signal recorded in each of the tracks comprises: a reproducing head which is arranged to trace the surface of the record bearing medium; memory means arranged to receive the video signals reproduced by said reproducing head and to store the given period portion of the video signal there; reproduced state detection signal forming means which is arranged to form, from the signal reproduced by said reproducing head, a reproduced state detection signal the level of which varies according to the reproduced state of the video signal; reference signal generating means for generating a reference signal which has a reference level; discriminating means arranged to discriminate a track pitch, at which the tracks are formed, by using signals reproduced by the reproducing head; comparison means for comparing the level of the reproduced state detection signal with that of the reference signal; control means arranged to control, on the basis of the signal output of the comparison means, writing into the memory means the video signal reproduced by the reproducing head; and change-over means arranged to change the level relation between the reproduced state detection signal and the reference signal from one level relation over to another on the basis of the output of the discriminating means.

Other objects and features of this invention will become apparent from the following detailed description of embodiments thereof taken in connection with the accompanying drawings.

DETAILED DESCRIPTION OF THE PREFERRED EMBODIMENTS

Figure 1:
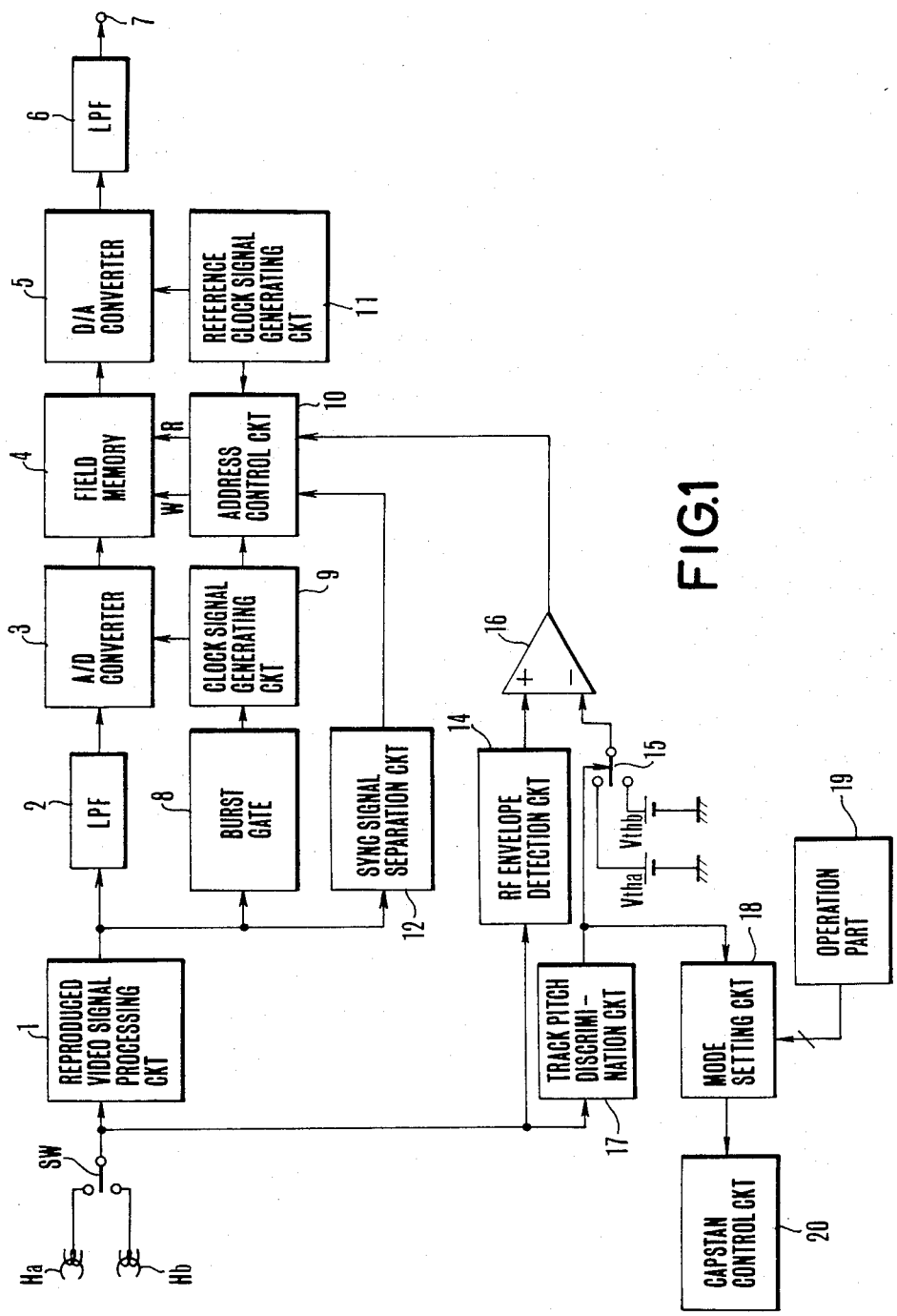
FIG. 1 is a block diagram showing in outline the reproducing system of a VTR which is arranged according to this invention as an embodiment thereof.

The following description will show the details of some of preferred embodiments of this invention with reference to the accompanying drawings:

FIG. 1 shows in outline the arrangement of a VTR arranged as an embodiment of this invention. The illustration includes reproducing heads Ha and Hb; a head change-over switch SW; a reproduced video signal processing circuit 1; a low-pass filter (hereinafter referred to as LPF) 2 which is arranged to control the band of the output of the circuit 1; an analog-to-digital (hereinafter referred to as A/D) converter 3; a field memory 4; a digital-to-analog (hereinafter referred to as D/A) converter 5; an LPF 6; an output terminal 7 arranged to produce a video signal therefrom; a burst gate 8 which is arranged to take out a burst signal from a video signal; a clock signal generating circuit 9 which is arranged to generate, in synchronism with the burst signal taken out, a sampling clock signal of a frequency four times as high as that of a color subcarrier; an address control circuit 10 which is arranged to control the address of the field memory 4; a reference clock signal generating circuit 11 which is arranged to generate a reference clock signal for controlling a reading action on the field memory 4; a synchronizing (hereinafter referred to as sync for short) signal separation circuit 12 which is arranged to extract a vertical sync signal from the video signal; an RF envelope detection circuit 14; a switch 15; a comparator 16; a track pitch discrimination circuit 17; a mode setting circuit 18 which is arranged to determine the operation mode of the VTR; an operation part 19; and a capstan control circuit 20.

Each of the parts shown in FIG. 1 operates in the following manner: Video signals reproduced by the rotary heads Ha and Hb are combined into a continuous signal by the switch SW. The continuous signal thus obtained is supplied to the reproduced video signal processing circuit 1. The circuit 1 brings the form of the video signal from its signal form suited for magnetic recording back to a signal form which is in conformity to a TV signal form. A signal thus obtained from the circuit 1 is supplied to the LPF 2 to have its band limited there. The output of the LPF 2 is converted into a digital signal (or data) by the A/D converter 3. The A/D conversion timing of the A/D converter 3 is determined by the clock signal which is produced by the clock signal generating circuit 9 at a frequency four times as high as that of the color subcarrier in synchronism with the burst signal extracted by the burst gate 8. The data produced from the A/D converter 3 is suitably written into the field memory 4 under the control of the address control circuit 10, which controls the writing address and also determines whether or not the data is to be written into the field memory 4.

The writing address of the field memory 4 is determined by the number of clock pulses produced by the clock signal generating circuit 9 after a point of time at which a vertical sync signal is separated by the sync signal separation circuit 12 from the output of the circuit 1. Then, the output of the address control circuit 10 is supplied to the field memory 4 as address control data W. Further, in case that no writing is to be made into the field memory 4 as will be described later, the writing address data W is not supplied to the field memory 4.

Meanwhile, the reading address of the field memory 4 is determined by the number of clock pulses produced by the reference clock signal generating circuit 11 after the timing of the vertical sync signal. The address control circuit 10 in that case supplies a reading address control data R to the field memory 4.

The reference clock signal generating circuit 11 produces the clock pulses at a fixed frequency which is four times as high as the frequency of the color subcarrier and also used for determining the D/A converting timing of the D/A converter 5. The D/A converter 5 brings the video signal read out from the field memory 4 back into an analog signal. The analog signal produced from the D/A converter 5 is supplied to the LPF 6 to have its band limited there and is then supplied to the output terminal 7.

In carrying out a high speed search (or look-up) operation, whether or not the data is to be written into the field memory 4 is determined according to the output of the comparator 16. More specifically, the presently reproduced signal is considered to include "a good video signal" if the envelope level of a reproduced RF signal which is produced from the RF envelope detection circuit 14 is above a signal which represents a predetermined given level and is supplied via the switch 15. In this instance, the comparator 16 produces its output at a high level (hereinafter referred to as an H level).

The level of the given level signal to be supplied to the comparator 16 is selected from between one level Vtha and another level Vthb by the switch 15 according to track pitch information obtained by the track pitch discrimination circuit 17.

This track pitch discrimination circuit 17 is briefly described as follows: Let us assume that the recording tracks are formed on a magnetic tape at one of two different track pitches TPS and TPL. The track pitch discrimination circuit 17 is arranged to produce its output either at an H level or at a low level (hereinafter referred to as an L level). The circuit 17 is arranged to make a discrimination between theses two track pitches in accordance with, for example, a method disclosed in U.S. Pat. No. 4,594,618.

The mode setting circuit 18 determines the travelling speed of the tape in accordance with information received from the operation part 18 about the selection of one mode from among varied modes including a standard reproduction mode, a slow motion reproduction mode, a high speed search reproduction mode, etc. as well as information on the track pitch discrimination made by the track pitch discrimination circuit 17. The circuit 18 then causes the capstan control circuit 20 to allow the tape to travel at a desired tape speed. The above stated levels Vtha and Vthb which are to be switched from one over to the other by the switch 15 as mentioned above are predetermined as follows: FIGS. 2(a) to 2(f) show the principle on which these levels V are predetermined. In these drawings, the track pitch TPS is assumed to be 20 μm, the track pitch TPL to be 10 μm and the tape travel speed for the high speed search reproduction to be eight times as high as a speed at which the tape travels for recording.

Figure 2A:
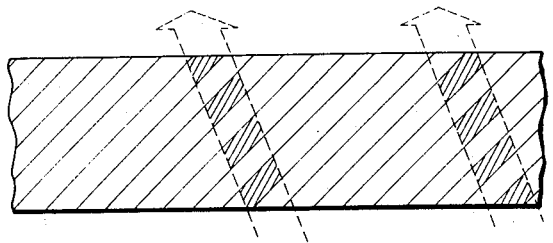
FIGS. 2(a) to 2(f) show in a timing chart the signals which are supplied to a comparator included in the embodiment shown in FIG. 1.
Figure 2B:
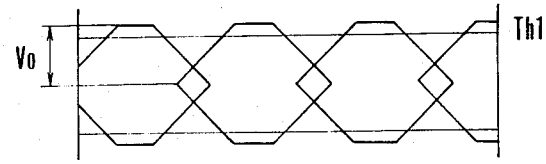
Figure 2C:
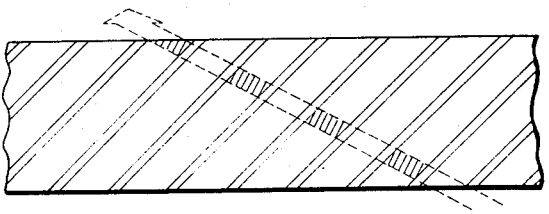
Figure 2D:
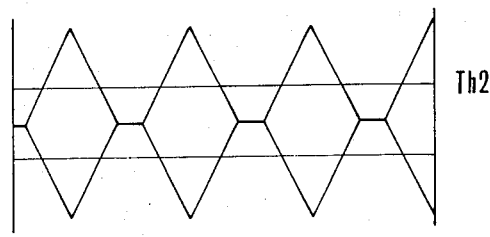
Figure 2E:
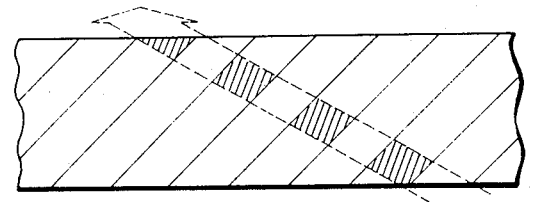
Figure 2F:
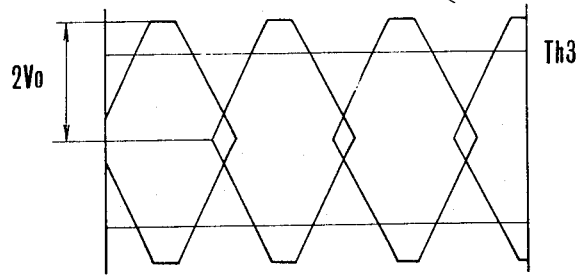

FIG. 2(a) shows the tracing locus on the tape of a rotary head measuring 13 μm in head width obtained in a mode (an LP mode) of recording or reproduction at the track pitch of 10 μm. FIG. 2(b) shows one field portion of the wave form of a reproduced signal obtained in this instance. FIG. 2(c) shows the tracing locus on the tape of a rotary head measuring 16 μm in head width obtained in a mode (an SP mode) of recording or reproduction at the track pitch of 20 μm. FIG. 2(d) shows one field portion of the wave form of a reproduced signal obtained in that instance. FIG. 2(e) shows the tracing locus on the tape of a rotary head measuring 24 μm in head width obtained in the SP mode. FIG. 2(f) shows one field portion of the wave form of a reproduced signal obtained in the case of FIG. 2(e).

The given level which is to be used in deciding whether or not the data is to be written into the field memory is set at such a value that the data for the whole picture plane can be rewritten by two tracing performances of the rotary head including one tracing performance by each of two heads of plus and minus azimuth angles and that the rewriting can be performed with a video signal obtained from a reproduced signal having the reproduced RF signal envelope at a level as high as possible. In other words, with the tape travel speed for a high speed search assumed to be an even number times as high as the recording tape speed, the given level must be set at such a value that enables at least one half of the video signal forming one picture plane to be written into the field memory 4 in the case of the high speed search reproduction.

Again referring to FIGS. 2(b), 2(d) and 2(f), threshold levels Th1, Th2 and Th3 are preset on the above stated concept. Assuming that the envelope detection level of the reproduced RF signal obtained from the track measuring 10 μm in width is V0, the threshold levels are determined to be Th1=0.8 V0, Th2=0.6 V0, and Th3= 1.4 V0 respectively. This can be generically expressed as follows: Assuming that the head width is Hw (μm) and the track pitch Tp and that the track width coincides with the head width Hw in the case of Tp >Hw, the above stated given preset level Vth can be expressed as follows:

$$Vth = V0 (Hw - (\tfrac{1}{2})Tp)/10$$

In carrying out reproduction in both the SP mode and the LP mode with the rotary head of 14 μm, for example, the given level Vtha which is for the track pitch TPL becomes [V0 (14−5)/10=]0.9 V0. Meanwhile, the given level Vthb for the track pitch TPS becomes [V0 (14−10)/10=]0.4V0.

In the embodiment described in the foregoing, the time intervals at which the video signal is read out from the field memory 4 never exceed 8/30 sec. In addition to that, only the parts of the video signal that have the best S/N ratio are allowed to be produced for each of the varied track pitches. Therefore, reproduced picture outputs can be obtained in an excellent state irrespective of variations of the track pitch.

Figure 3:
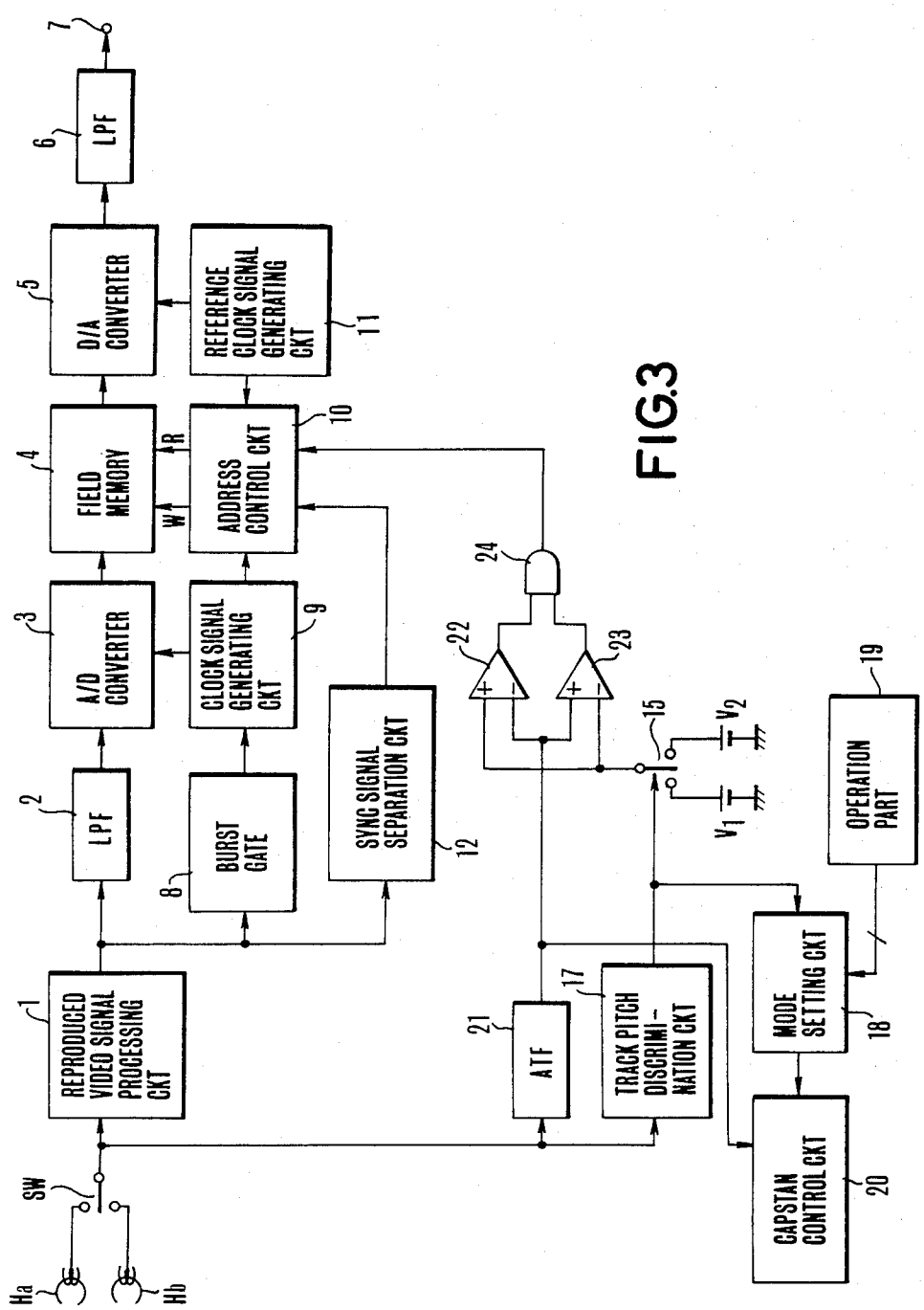
FIG. 3 is a block diagram showing in outline the reproducing system of a VTR which is arranged as another embodiment of this invention.
Figure 4A:
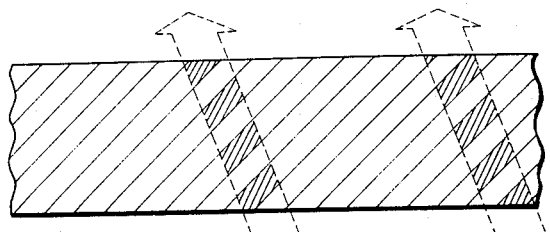
FIGS. 4(a) to 4(f) show in a timing chart the signals supplied to a window comparator which is included in the embodiment shown in FIG. 3.
Figure 4B:
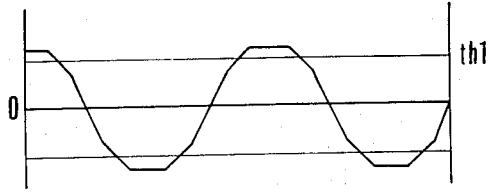
Figure 4C:
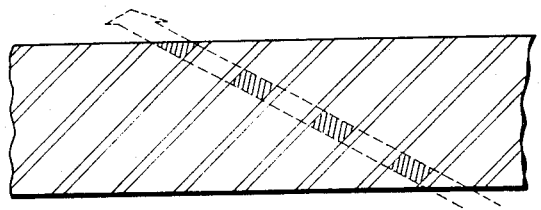
Figure 4D:
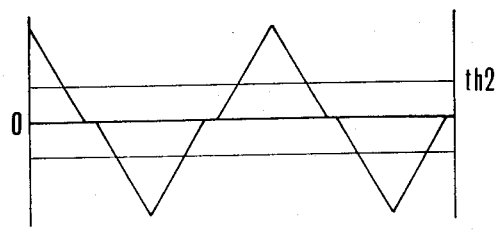
Figure 4E:
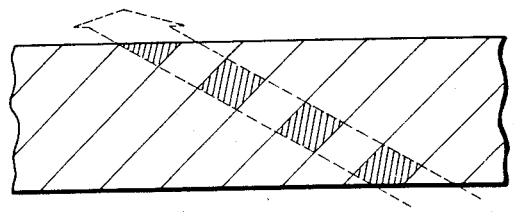
Figure 4F:
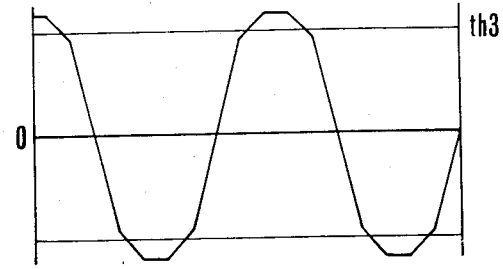

FIG. 3 shows in outline the arrangement of the reproducing system of a VTR which is arranged as another embodiment of this invention. In FIG. 3, all the component parts that are similar to those shown in FIG. 1 are indicated by the same reference numerals as those used in FIG. 1 and the details of them are omitted from the following description. The embodiment is provided with a tracking error signal generating circuit 21 (hereinafter referred to as ATF circuit) which is arranged to generate a tracking error signal in accordance with, for example, the known four-frequency method. In this case, a decision as to whether or not the data is to be written into the field memory 4 during a high speed search reproducing process is arranged to be made according to whether an error level indicated by an ATF signal produced from the ATF circuit 21 is above or below a given level. The ATF signal is arranged to be at a zero level when there is no tracking error and to be supplied to a window comparator which includes comparators 22 and 23 and an AND gate 24. The window comparator is arranged to make a discrimination as to whether the absolute value of the ATF signal is above or below the given level, which is indicated by a given level signal supplied to the window comparator. The level signal is arranged to be switched between two different predetermined levels V1 and V2 from one over to the other by means of a switch 15 according to the track pitch information discriminated by the track pitch discrimination circuit 17. The levels V1 and V2 are further described below with reference to FIGS. 4(a) to 4(f):

FIG. 4(a) shows a tracing locus formed on the tape in the recording or reproducing LP mode, at the track pitch of 10 μm, by a rotary head measuring 13 μm in head width. FIG. 4(b) shows the wave form of one field portion of the ATF signal obtained under the condition of FIG. 4(a). FIG. 4(c) shows a tracing locus formed on the tape in the SP recording or reproducing mode, at the track pitch of 20 μm by a rotary head measuring 16 μm in head width. FIG. 4(d) shows the wave form of one field portion of the ATF signal obtained under the condition of FIG. 4(c). Further, FIG. 4(e) shows a tracing locus formed on the tape in the SP mode by a rotary head measuring 24 μm in head width. FIG. 4(f) shows the wave form of one field portion of the ATF signal obtained under the condition of FIG. 4(e).

The criterion for setting the given level to be used as reference in deciding whether the data is to be written into the field memory 4 is similar to that of the preceding embodiment shown in FIG. 1. Namely, the given level is set at such a value that the data for a whole picture plane can be rewritten by two tracing performances of the rotary head including one tracing performance by each of two heads of plus and minus azimuth angles and that the rewriting can be performed with a video signal obtained from a reproduced signal having the reproduced RF signal at a level as high as possible. With the embodiment arranged in this manner, the AND gate 24 supplies a signal to the address control circuit 10 at an H level when the tracking error is small and at an L level in the event of a large tracking error.

As apparent from FIGS. 4(a) to 4(f), the ATF signal changes with the track pitch and the head width serving as parameters. Therefore, the given level is set according to the track pitch at one of values th1, th2 and th3 as shown in FIGS. 4(b), 4(d) and 4(f) as applicable. The level values V1 and V2 of the given level thus set are arranged to be changed from one over to the other by means of the switch 15. This arrangement gives the same advantageous effect as in the case of the embodiment shown in FIG. 1.

In the specific embodiments described above, the RF detection signal or the ATF signal is employed as a reproduced state detection signal on the basis of which the acceptability of the reproduced video signal is determined. However, this invention is not limited to the use of these signals. The same purpose is likewise attainable by employing some other signal in place of the above stated signals.

While the high speed search reproduction is alone described in the foregoing, this invention is likewise advantageously applicable to a slow-motion reproducing operation.

What is claimed is:

1. A video signal reproducing apparatus for reproducing a video signal from a record bearing medium on which many recording tracks are formed in parallel to each other comprising:
   (a) a reproducing head which is arranged to trace the surface of the record bearing medium;
   (b) memory means arranged to receive said video signals reproduced by said reproducing head and to store said video signal therein;
   (c) tracking condition detection signal forming means which is arranged to form, by using the signal produced by said reproducing head, a tracking condition detection signal the level of which varies according to the tracking condition of said reproducing head;
   (d) reference signal generating means for generating a reference signal which has a reference level;
   (e) discriminating means arranged to discriminate a track pitch, at which said tracks are formed, by using signals reproduced by said reproducing head;
   (f) comparison means for comparing the level of the tracking condition detection signal with that of said reference signal;
   (g) control means arranged to control, on the basis of the signal output of said comparison means, whether or not said video signal is written into said memory means; and
   (h) change-over means arranged to change a level relation between the tracking condition detection signal and said reference signal from one relation over to another on the basis of the output of said discriminating means.

2. An apparatus according to claim 1, wherein said tracking condition detection signal forming means includes detection means for detecting the envelope of the signal reproduced by said reproducing head.

3. An apparatus according to claim 1, wherein said tracking condition detection signal forming means includes means for forming tracking error signal which is indicative of a tracking error of said reproducing head and is obtained from the signals reproduced by said head.

4. An apparatus according to claim 3, wherein said comparison means includes a window comparator which is arranged to receive said tracking error signal and said reference signal.

5. An apparatus according to claim 1, wherein said change-over means is arranged to change the level of said reference signal from one level over to another on the basis of the output of said discriminating means.

6. An apparatus according to claim 1, further comprising medium moving means for moving said record bearing medium in a direction of crossing said tracks.

7. An apparatus according to claim 6, further comprising speed change-over means for changing the speed at which said record bearing medium is moved by said medium moving means from one speed over to another on the basis of the output of said discriminating means.

8. An apparatus according to claim 6, wherein said tracking condition detection signal forming means includes means for forming a tracking error signal indicating a tracking error of said reproducing head by using signals reproduced by said reproducing head.

9. An apparatus according to claim 7, further comprising control means for controlling said medium moving means on the basis of said tracking error signal.

10. A video signal reproducing apparatus for reproducing a video signal from a tape-shaped record bearing medium on which many recording tracks are formed in parallel to each other with a one-field of the video signal recorded in each of said tracks comprising:
    (a) a rotary head which is arranged to trace the surface of said tape shaped medium in a direction of crossing the longitudinal direction of said medium;
    (b) memory means arranged to receive said video signal reproduced by said reproducing head and to store said one-field of the video signal there;
    (c) detection means arranged to detect the envelope of an RF signal reproduced by said rotary head and to produce a detection signal;
    (d) reference signal generating means for generating a plurality of reference signals having different reference levels from each other;
    (e) selecting means for selectively producing one of said plurality of reference signals;
    (f) discriminating means arranged to discriminate a track pitch, at which said tracks are formed, by using signals reproduced by said rotary head;
    (g) comparison means for comparing the level of said detection signal with that of the reference signal produced from said selecting means;
    (h) writing control means for controlling, on the basis of the output of said comparison means, whether or not said video signal is written into said memory means; and
    (i) selecting action control means for controlling the selecting action of said selecting means on the basis of the output of said discriminating means.

11. An apparatus according to claim 10, further comprising medium moving means for longitudinally moving said tape-shaped record bearing medium.

12. An apparatus according to claim 11, further comprising change-over means for changing the medium moving speed of said medium moving means from one speed over to another on the basis of the output of said discriminating means.

13. An apparatus according to claim 11, further comprising control means for controlling the moving action of said medium moving means on said record bearing medium, said control being arranged to be performed on the basis of the output of said discriminating means and said tracking error signal.

14. An apparatus for reproducing a video signal from a tape-shaped record bearing medium on which many recording tracks are obliquely formed in parallel to each other with a one-field of the video signal recorded in each of said recording tracks, comprising:

(a) a rotary head arranged to trace the surface of said tape-shaped record bearing medium in a direction crossing the longitudinal direction of said medium;

(b) memory means arranged to receive video signals reproduced by said rotary head and to store said one-field of the video signal;

(c) a tracking error signal forming means for forming a tracking error signal indicative of a tracking error of said rotary head relative to said obliquely formed recording tracks, said tracking error signal being formed by using signals reproduced by said rotary head;

(d) reference signal generating means for generating a plurality of reference signals which have different reference levels from each other;

(e) selecting means arranged to selectively produce one of said plurality of reference signals;

(f) discriminating means arranged to discriminate a track pitch, at which said tracks are formed, by using signals reproduced by said rotary head;

(g) comparison means for comparing the absolute value of the level of said tracking error signal with the level of said reference signal produced from said selecting means;

(h) writing control means for controlling whether or not said video signal is written into said memory means on the basis of the output of said comparison means; and (i) selecting action control means for controlling the selecting action of said selecting means on the basis of the output of said discriminating means.

15. An apparatus according to claim 14, further comprising medium moving means for longitudinally moving said tape-shaped record bearing medium.

* * * * *